United States Patent Office 3,519,682
Patented July 7, 1970

3,519,682
SULPHONIC ACID DERIVATIVES OF OLIGOMERS OF PERFLUOROOLEFINS
Harold Crosbie Fielding, Northwich, England, assignor to Imperial Chemical Industries Limited, London, England, a corporation of Great Britain
No Drawing. Filed July 11, 1967, Ser. No. 652,418
Claims priority, application Great Britain, July 29, 1966, 34,232/66
Int. Cl. C07c *143/16*
U.S. Cl. 260—513                                                10 Claims

ABSTRACT OF THE DISCLOSURE

Preparation of novel sulphonic acid derivatives of oligomers of tetrafluoroethylene and of hexafluoropropene, in which sulphonic acid groups are attached through their sulphur atoms to carbon atoms in the oligomer residue, particularly the sulphonic acid derivative $C_9F_{16}HSO_3H$ of tetrafluoroethylene pentamer $(C_2F_4)_5$, and its salts, by heating an oligomer with an aqueous solution of an alkali metal sulphite or bisulphite to give the alkali metal sulphonate from which the sulphonic acid derivative of the oligomer is obtained by acidification with sulphuric acid, and its salts by standard methods thereafter. Preferred reaction conditions for the pentamer $(C_2F_4)_5$ are a temperature of 100° C. to 200° C., autogenous pressure, sodium sulphite as the alkali metal sulphite, and a reaction time of 20–50 hours. The sulphonic acid derivatives and their salts are highly surface-active in aqueous solution and are particularly useful as dispersing agents in aqueous emulsion polymerisations of tetrafluoroethylene. The sulphonic acid $C_9F_{16}HSO_3H$ is also an intermediate for the preparation of the compounds possessing surface-active and oleophobic properties, for example it can be converted into the sulphonyl chloride $C_9F_{16}HSO_2Cl$ which can then be reacted with amines to give sulphonamides having surface-active properties in themselves and the ability to undergo quaternisation and other reactions to yield other surfactants.

BACKGROUND OF THE INVENTION

Field of the invention

Aliphatic fluorine chemistry based on perfluoroolefins particularly on oligomers of tetrafluoroethylene.

Description of prior art

No prior art relating to tetrafluoroethylene oligomers. Hexafluoropropene oligomers namely dimers and trimers are disclosed for the first time in U.S. Pat. 2,918,501 and described as being highly stable both thermally and chemically.

SUMMARY OF THE INVENTION

Novel sulphonic acid derivatives of oligomers of tetrafluoroethylene and of hexafluoropropene are made by heating an oligomer at 100° C. to 200° C., preferably under autogenous pressure, for several hours with an aqueous solution of an alkali metal sulphite or bisulphite, separating the alkali metal sulphonate formed and acidifying it to obtain the sulphonic acid derivative.

This invention relates to highly fluoroinated compounds containing functional groups, particularly to novel sulphonic acids and their salts derived from oligomers of perfluoroolefins.

In this specification the term oligomer means a polymer of low molecular weight that is unsaturated and contains one or more reactive fluorine atoms, for example the tetramer $(C_2F_4)_4$, pentamer $(C_2F_4)_5$ and hexamer $(C_2F_4)_6$ of tetrafluoroethylene; and the dimer $(C_3F_6)_2$, and trimer $(C_3F_6)_3$ of hexafluoropropene.

Such oligomers react with organic nucleophiles, for example certain alkali metal alkoxides, phenoxides, Grignard compounds and amines to give, by elimination of fluorine, derivatives containing functional groups in which the latter are attached to the oligomer residue by organic links. For example the reaction between tetrafluoroethylene pentamer $(C_2F_4)_5$ and the substituted phenoxide 1-sodiooxybenzene-4-sulphonic acid $NaOC_6H_4SO_3H$ yields an oligomer derivative containing a sulphonic acid group in which the latter is attached indirectly to the oligomer residue through the benzene ring as shown by the formula $C_{10}F_{19}OC_6H_4SO_3H$. This and related sulphonic acids possess marked surface-active properties and are particularly useful in reaction and other systems where a lowering of surface-tension is beneficial. If one were able to attach a sulphonic acid group directly to an oligomer residue one might obtain derivatives possessing even more well-marked surface-active properties.

We have now found that alkali metal sulphites and bisulphites can be made to react with these oligomers to give novel highly fluorinated alkali metal sulphonates, from which the acids themselves and other salts can be readily obtained, in which the sulphonate or sulphonic acid groups are directly attached through their sulphur atoms to carbon atoms of the oligomer residues.

The invention thus in its general form provides sulphonic acid derivatives of oligomers of perfluoroolefins, in which sulphonic acid groups are attached through their sulphur atoms to carbon atoms of the oligomer residues, and salts thereof.

In a particular form the invention provides a sulphonic acid derivative of tetrafluoroethylene pentamer $(C_2F_4)_5$ having the empirical formula $C_9F_{16}HSO_3H$ and salts thereof.

The invention also provides a process for making sulphonic acid derivatives of oligomers of perfluoroolefins comprising heating an oligomer with an aqueous solution of an alkali metal sulphite or bisulphite or of a mixture of the two, separating the resulting alkali metal salt of the sulphonic acid derivative and acidifying it to give the corresponding sulphonic acid.

Suitable alkali metal sulphites and bisulphites are those of sodium, potassium and lithium, and a convenient general method of carrying out the reaction is to heat the oligomer with an aqueous solution of the salt or salts at a temperature of 100° C. to 200° C. in an autoclave fitted with a stirrer. A preferred method is to heat the oligomer with an aqueous solution of sodium sulphite at 120° C. to 150° C. under autogenous pressure in a stirred autoclave for several hours, after which the contents are made just alkaline with sodium carbonate and steam distilled to remove unreacted oligomer. The residue is evaporated to dryness and the solids extracted with hot ethanol to give a solution of the sodium sulphonate which is isolated by distillation away of the ethanol. To obtain the sulphonic acid the sodium sulphonate is acidified with concentrated sulphuric acid and the resulting sulphonic acid separated by distillation. From the acid other salts, for example alkali metal salts, the ammonium salt, alkylammonium salts, amine salts and salts of other metals can be obtained by standard methods for preparing salts from acids.

It has not yet been possible to characterise the sulphonic acid derivatives obtained by reactions between alkali metal sulphite and the tetramer, hexamer and higher oligomers of tetrafluoroethylene, and the dimer and trimer of hexafluoropropene, beyond ascertaining that they do contain sulphonic acid groups attached to oligomer residues, and that they all exhibit surface active properties in aqueous solution. The sulphonic acid derivative of tetrafluoroethylene pentamer has on the other hand been well characterised in that its empirical formula is $C_9F_{16}HSO_3H$ and its properties are consistent with the structural Formula (I) which shows its relation to the pentamer which is considered to have the structural Formula (II)

$$(C_2F_5)_2(CF_3)C.CH{=}C(CF_3)SO_3H \quad (I)$$
$$(C_2F_5)_2(CF_3)C.CCF_3{=}C(CF_3)F \quad (II)$$

The acid (I) and its salts are highly surface active, for example a 1% by weight solution of the sodium salt has a surface-tension of 22 dynes/cm. at 25° C. They exhibit this surface activity even in the presence of strong acids and bases, and are useful as special surfactants in aqueous media particularly where a system having very low surface-tension is required, or where a surfactant possessing high chemical stability is necessary. For example the acid and its water soluble salts, particularly the ammonium salt, are especially useful in the aqueous emulsion polymerisation of tetrafluoroethylene and vinylidene fluoride by free radical-producing catalysts.

The acid (I) can be used as an intermediate in the preparation of other surface-active agents and surface finishes for imparting oil and water repelling properties to textiles and other substrates. For example it can be converted into a sulphonyl chloride by reaction with phosphorus pentachloride, and the sulphonyl chloride can then be reacted with an amine such as diethylaminopropane diamine to give a sulphonamide exhibiting good surface activity in organic solvents and yielding, by quaternisation for example with methyl iodide, a cationic surface active agent showing activity in aqueous systems.

The invention is illustrated by Examples 1–5. Examples 6 and 7 illustrate the use of the ammonium salt of the tetrafluoroethylene pentamer sulphonic acid (I) in the emulsion polymerisation of tetrafluoroethylene and Example 8 its use in the emusion polymerisation of vinylidene fluoride. Examples 8–11 illustrated the use of the acid as an intermediate.

EXAMPLE 1

Sodium sulphite (10 g.), water (20 mls.) and tetrafluoroethylene pentamer (25 g.) were sealed in a glass ampoule and heated, with shaking, at 180° C. for 12 hours. The reaction products were made alkaline with 5% aqueous sodium carbonate and steam-distilled to remove unreacted pentamer (14 g.). The remaining solution was evaporated to dryness and the solid residue extracted with hot ethanol, and the extract evaporated to give 8 g. of the sodium salt of the sulphonic acid. The salt was suspended in water, acidified with concentrated sulphuric acid and the sulphonic acid extracted with ether. Evaporation of the ether gave 7 g. of acid which on distillation gave 5.6 g. of the pure acid which was a low-melting hygroscopic solid boiling at 115° C./2 mm. Hg.

Analysis.—$C_9F_{16}HSO_3H$ requires (percent): C, 21.8; H, 0.4; S, 6.5; F, 61.5. Found (percent): C, 21.2; H, 0.8; S, 6.8; F, 60.8.

Nuclear magnetic resonance ($F^{19}$ and $H^1$) measurements were consistent with the structure $$(C_2F_5)_2(CF_3)C.CH{=}C(CF_3)SO_3H$$

which was also in agreement with the mass spectrum.

EXAMPLE 2

The sodium sulphite in the reaction described in Example 1 was replaced by lithium sulphite in an otherwise identical reaction. The yield of sulphonic acid was 5 g. and 16 g. of pentamer was recovered unchanged.

EXAMPLE 3

Sodium sulphite (250 g.), water (500 mls.) and tetrafluoroethylene pentamer (200 g.) were stirred in an autoclave and heated to 135° C. for 60 hours. The contents were then cooled, steam-distilled to remove 100 g. of unreacted pentamer. The remaining slurry was evaporated to dryness and the solids extracted with hot ethanol. Distillation of the extract gave 110 g. of solid sodium sulphonate which after acidification with concentrated sulphuric acid yielded 90 g. of the pentamer sulphonic acid.

EXAMPLE 4

Sodium sulphite heptahydrate (12.6 kilos), water (10 litres) and tetrafluoroethylene pentamer (5 kilos) were stirred under nitrogen in a 25 litre autoclave at 145° C.– 150° C. for 30 hours, after which the product slurry was discharged, the clear supernatant liquid decanted and the remaining slurry steam distilled to remove unreacted pentamer (1.1 kilos). The residue was filtered and dried and extracted with hot ethanol to give 2.5 kilos of the sodium sulphonate from which acidification with dilute sulphuric acid followed by extraction with ether gave 2.25 kilos of sulphonic acid.

EXAMPLE 5

The pentamer sulphonic acid (500 g.) was dissolved in 1,2,2-trifluoro-1,1,2-trichloroethane and anhydrous ammonia bubbled through the solution at room temperature until precipitation of the ammonium salt was complete. The solvent was removed by evaporation under vacuum to yield 510 g. of a white crystalline solid ammonium salt $$(C_2F_5)_2(CF_3)C.CH{=}C(CF_3)SO_3NH_4$$

Analysis.—$C_9F_{16}H_5NSO_3$ requires (percent): C, 21.1; H, 1.0; F, 59.5; N, 2.7; S, 6.3. Found (percent): C, 20.9; H, 1.4; F, 58.9; N, 3.1; S. 6.8.

Nuclear magnetic resonance ($F^{19}$ and $H^1$) measurements and mass-spectrographic analysis were consistent with the formula given. A 1.0% aqueous solution of this ammonium salt had a surface-tension of 22.0 dynes/cm. at 25° C.

EXAMPLE 6

A stainless steel autoclave fitted with a stirrer was charged with 1000 parts by weight of distilled water, 0.25 part of the ammonium salt of tetrafluoroethylene pentamer sulphonic acid, 0.6 part of disuccinic acid peroxide and 5 parts of eicosane. The autoclave was then evacuated to remove oxygen and pressurised with tetrafluoroethylene to 15 lb./sq. in. gauge. The reaction system was then heated whilst stirring to 70° C. and further tetrafluoroethylene introduced up to a pressure of 300 lb./sq. in. gauge. When the pressure fell to 290 lb./sq. in. gauge more tetrafluoroethylene was introduced to restore the pressure to 300 lb./sq. in. This procedure was repeated throughout a reaction time of 75 minutes after which an aqueous colloidal dispersion of tetrafluoroethylene containing 17.2% by weight of the dispersed polymer was obtained. No coagulated polymer was present. The reaction rate measured by the space/time yield of dispersed polymer was 159 grams/litre/hour.

EXAMPLE 7

A stainless steel autoclave fitted with a stirrer was charged with 4000 parts by weight of distilled water, 2.66 parts of disuccinic acid peroxide and 20 parts of eicosane after which it was evacuated to remove oxygen and then pressurised with tetrafluoroethylene to 15 lb./sq. in. gauge. The reaction system was then heated to 70° C. and further tetrafluoroethylene introduced to 300 lb./sq. in. gauge. When the pressure fell to 290 lb./sq. in. gauge more tetrafluoroethylene was introduced to restore the pressure to 300 lb./sq. in. This procedure was repeated throughout the reaction, but when 200 parts of polymer had been formed, as indicated by a total pressure drop of 80 lb./sq. in. a solution of 1 part of the ammonium salt of tetrafluoroethylene pentamer sulphonic acid in 100 parts of water was injected into the reaction system.

After a total polymerisation time of 109 minutes an aqueous colloidal dispersion of polytetrafluoroethylene containing 16.6% by weight of the dispersed polymer was obtained. No coagulated polymer was present. The reaction rate measured by the space/time yield of dispersed polymer was 108 grams/litre/hour.

EXAMPLE 8

De-oxygenated water (100 mls.), disodiumhydrogen phosphate (0.7 g.), potassium dihydrogen phosphate (0.7 g.), ammonium persulphate (0.2 g.) and the ammonium salt of tetrafluoroethylene pentamer sulphonic acid were placed in a 250 ml. rocking vessel which was then cooled and vinylidene fluoride (11 g.) distilled in. The closed vessel was rocked for 16 hours at 60° C. after which it was cooled to room temperature, unreacted vinylidene fluoride vented and 9 g. of polyvinylidene fluoride isolated in the form of a white powder.

EXAMPLE 9

Tetrafluoroethylene pentamer sulphonic acid (50 g.) was stirred at 30°–35° C. with an excess of phosphorus pentachloride. After the initial evolution of hydrogen chloride the mixture was refluxed for one hour and then distilled to give phosphorus oxychloride as a first fraction and the sulphonyl chloride $$(C_2F_5)_2(CF_3)C \cdot CH = C(CF_3)SO_2Cl$$

(40 g.) as the second.

EXAMPLE 10

A solution of the suphonyl chloride (5.1 g.), prepared as described in Example 9, in 50 mls. diethyl ether was added dropwise to 2.6 g. N,N-diethyl-1,3-diaminopropane, $NH_2(CH_2)_3N(CH_3)_2$, in 50 mls. diethyl ether. After stirring for one hour at room temperature the ether layer was decanted from a small solid residue and distilled to give a viscous oil which was shown by analysis to correspond to the sulphonamide

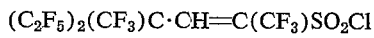

$$(C_2F_5)_2(CF_3)C.CH = C(CF_3)SO_2NH(CH_2)_3N(CH_3)_2$$

This sulphonamide when dissolved in diethyl ether was quaternised with methyl iodide to give the quaternary ammonium iodide $$(C_2F_5)_2(CF_3)C.CH = C(CF_3)SO_2NH(CH_2)_3N(CH_3)_3{}^+I^-$$

which exhibited cationic surface-activity.

EXAMPLE 11

A solution of the sulphonyl chloride (51.2 g.), prepared as described in Example 9, in dry diethyl ether (100 mls.) was added to a stirred solution of N-ethylaminoethanol (17.8 g.) in dry diethyl ether (50 mls.) at 0° C. After stirring at ambient temperature for one hour the ether solution was decanted from the solids and evaporated to give a viscous oil shown by analysis to correspond to the sulphonamide derivative

$$(C_2F_5)_2(CF_3)C.CH = C(CF_3)SO_2N(C_2H_5)CH_2CH_2OH$$

This compound was dissolved in diethyl ether and reacted with acryloyl chloride in the presence of a small quantity of pyridine to give the acrylate monomer $$(CF_2F_5)_2(CF_3)C.CH = C(CF_3)SO_2N(C_2H_5)$$
$$CH_2CH_2O.COCH = CH_2$$

The crude monomer after purification with active carbon was polymerised with benzoyl peroxide as initiator to give a polymer soluble in 1,1,2-trifluoro-1,2,2-trichloroethane that imparted oleophobic properties to substrates such as cotton, wool, leather and paper.

What I claim is:

1. Sulphonic acid derivatives of oligomers of tetrafluoroethylene in which sulphonic acid groups are attached through their sulphur atoms to carbon atoms of the oligomer residues, and salts thereof.

2. The sulphonic acid derivative of tetrafluorothylene pentamer, having the empirical formula $C_9F_{16}HSO_3H$, and salts thereof.

3. The lithium, sodium and potassium salts of the sulphonic acid derivative of tetrafluoroethylene pentamer having the empirical formula $C_9F_{16}HSO_3M$ where M represents one atom of the metal.

4. The ammonium salt of the sulphonic acid derivative of tetrafluoroethylene pentamer having the empirical formula $C_9F_{16}HSO_3NH_4$.

5. A process for making sulphonic acid derivatives of oligomers of perfluoroolefins selected from the group consisting of the tetramer, pentamer and hexamer of tetrafluoroethylene and the dimer and trimer of hexafluoropropene comprising heating to 100° C. to 200° C. the oligomer with an aqueous solution containing at least one salt selected from alkali metal sulphite and bisulphites, separating the resulting alkali metal salt of the sulphonic acid derivative of the oligomer and acidifying it to give the corresponding sulphonic acid derivative.

6. A process for making the sulphonic acid derivative of tetrafluoroethylene pentamer comprising heating tetrafluoroethylene pentamer with an aqueous solution of sodium sulphite at a temperature of 100° C. to 200° C. under autogenous pressure, separating the sodium salt of the sulphonic acid derivative of tetrafluoroethylene pentamer and acidifying it to give the sulphonic acid derivative.

7. The sulphonic acid derivatives of claim 3 having the structural formulas $$(C_2F_5)_2(CF_3)C.CH = C(CF_3)SO_3H \qquad (I)$$

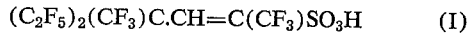

8. Sulphonic acid derivatives of claim 1 wherein the oligomers are the unsaturated tetramer, pentamer and hexamer and wherein the sulphonic acid groups are attached to the oligomer residue.

9. The process of claim 5 wherein the oligers are the tetrafluoroethylene oligomers.

10. The process of claim 9 wherein the oligomer is the tetrafluoroethylene pentamer.

References Cited

UNITED STATES PATENTS

| | | |
|---|---|---|
| 2,694,723 | 11/1954 | Schramm. |
| 2,918,501 | 12/1959 | Brehm et al. _____ 260—653.3 |
| 2,732,398 | 1/1956 | Brice et al. _____ 260—513 |
| 3,317,618 | 5/1967 | Haszeldine et al. ____ 260—513 |

FOREIGN PATENTS

| | | |
|---|---|---|
| 1,213,511 | 4/1960 | France. |

DANIEL D. HORWITZ, Primary Examiner

U.S. Cl. X.R.

117—141, 142, 143, 154, 155; 260—33.8, 486, 543, 556, 900